June 12, 1951     F. P. HEGEMAN     2,556,368

BEARING MOUNTING FOR SPINDLES

Filed Sept. 15, 1948

INVENTOR:
FRANKLYN P. HEGEMAN
by Romeyn A. Spare
HIS ATTORNEY.

Patented June 12, 1951

2,556,368

UNITED STATES PATENT OFFICE 2,556,368

BEARING MOUNTING FOR SPINDLES

Franklyn P. Hegeman, Union, N. J., assignor to General Motors Corporation, Detroit, Mich., a corporation of Delaware Application September 15, 1948, Serial No. 49,389

5 Claims. (Cl. 308—189)

This invention relates to bearing mountings for spindles. An object of the invention is to provide an improved antifriction mounting for high speed spindles such as grinding wheel spindles. Another object is to provide a simple and effective device to apply a preload to spindle bearings and support the latter. To these ends and also to improve generally upon apparatus of the character indicated, the invention consists in the various matters hereinafter described and claimed.

Figure 2:
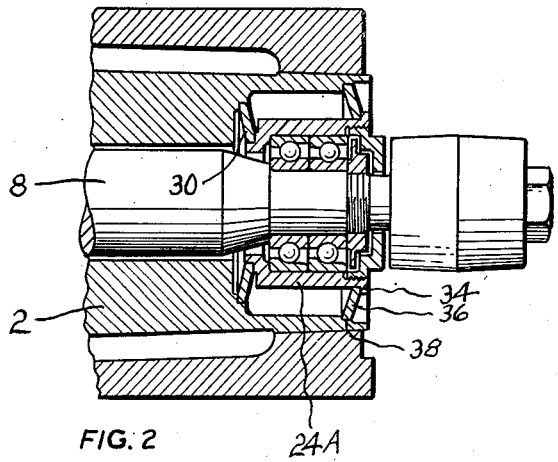
Figure 1:
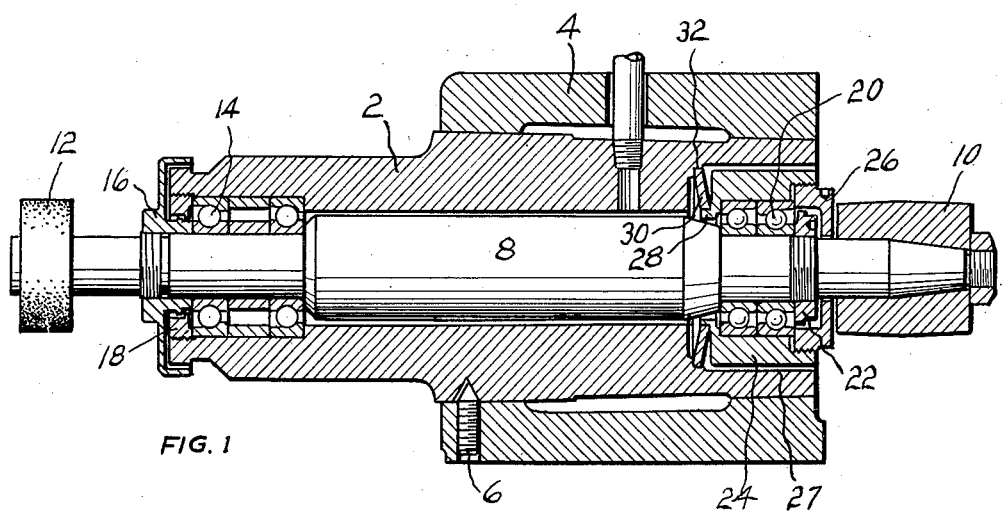

In the drawings, Fig. 1 is a vertical axial section and Fig. 2 is a similar view of a preferred modification.

A casing or quill 2 is secured in an internally tapered head 4 by a cone-pointed screw 6. Journalled in the quill for rotation is a shaft or spindle 8 having a driving pulley 10 at one end and a grinding wheel 12 at the other end. This is merely illustrative of one use for the spindle. Near the wheel end, the spindle is journalled for rotation in one or more bearings which will resist radial and thrust loads. Preferably there are two similar angular contact bearings 14 taking thrust load in the same direction, the inner and the outer race rings being spaced apart by sleeves. The inner race rings are clamped against a shoulder on the spindle by a threaded cap 16 and the outer race rings are clamped against a shoulder in the quill by a nut 18.

The bearings 14 are placed under an initial thrust load by the mounting at the pulley end of the spindle. This other mounting preferably comprises two abutting angular contact bearings 20 which have their inner race rings clamped against a shoulder on the spindle by a nut 22. The outer race rings are clamped in a shiftable cartridge or bearing housing 24 by a threaded cap 26. The bearing housing is contained in a counterbore 27 of the quill and has clearance therewith. A little flange 28 projects axially from the bearing housing and forms a pilot or seat for a spring 30 herein shown as a conical ring or Belleville washer which externally engages a seat 32 in the casing 2.

When the bearings are assembled and clamped in position the spring washer is deflected and laterally compressed to maintain a thrust load on all the bearings. The washer also performs the additional functions of centering and supporting the bearing housing. The preload on the bearings prevents lateral deflection of the spindle due to external load and compensates for expansion of the spindle due to heat and for inaccuracies and any possible wear. By using the spring washer to perform the plural functions of supporting the bearing housing and maintaining a pre-load, it is unnecessary to fit the housing slidably in the quill or fit the race rings slidably in the bearing housing. The reaction of belt pull tends to supplement the axial pressure exerted by the spring.

In Fig. 2, a bearing housing 24A is supported and centered by two spring washers. One end of the housing has an outwardly extending abutment flange 34 forming a seat engaged by the second washer 36 which is externally seated at 38 in the quill. The washers 30 and 36 jointly supply the preload and support the bearing housing. Their seats are concentric.

I claim:

1. In apparatus of the character indicated, a casing, a spindle mounted in the casing, bearing means in one portion of the casing for rotatably supporting the spindle and resisting a thrust load, a bearing housing spaced from said bearing means and having clearance with the casing, a thrust resisting bearing interposed between the spindle and the bearing housing, one end of the bearing housing having an axially projecting flange forming a seat and the casing, at the same end of the bearing housing, having a seat beyond the axially projecting flange and concentric with the housing seat, and a spring washer of conical shape held under lateral compression between the two seats and supporting the bearing housing.

2. In apparatus of the character indicated, a casing, a spindle mounted in the casing, bearing means in one portion of the casing for rotatably supporting the spindle and resisting a thrust load, a bearing housing contained in another portion of the casing and having clearance therewith, a thrust resisting bearing interposed between the spindle and the bearing housing, each end of the bearing housing having a seat and the casing having seats concentric therewith, and a pair of springs engaging the seats and held under lateral compression to apply a preload to the bearings.

3. In apparatus of the character indicated, a casing, a spindle mounted in the casing, bearing means in one portion of the casing for rotatably supporting the spindle and resisting a thrust load, a bearing housing contained in another portion of the casing and having clearance therewith, a thrust resisting bearing interposed between the spindle and the bearing housing, the bearing housing having an axially projecting flange at one end to form a seat and an outwardly projecting flange at the other end to form a seat, the casing having a pair of seats concentric with the housing seats, and a pair of spring washers engaging the seats and held under lateral compression to preload the bearings.

4. In apparatus of the character indicated, a casing, a spindle rotatably mounted in the casing, an angular contact bearing interposed between the spindle and the casing, a second angular contact bearing spaced axially from the first, a shiftable bearing housing containing the second bearing, and a spring washer of conical shape held under lateral compression between the casing and the bearing housing to preload the angular contact bearings and support the bearing housing.

5. In apparatus of the character indicated, a casing, a spindle rotatably mounted in the casing, a bearing housing surrounding the spindle and having clearance with the casing, a thrust-resisting bearing interposed between the bearing housing and the spindle, a conical spring washer seated between the casing and the bearing housing and held under lateral compression, bearing means between another portion of the casing and the spindle to resist said spring pressure, and the spring washer slanting from the casing to the bearing housing in a direction to cause lateral forces on the spindle to supplement the spring pressure.

FRANKLYN P. HEGEMAN.

REFERENCES CITED

The following references are of record in the file of this patent:

UNITED STATES PATENTS

| Number | Name | Date |
| --- | --- | --- |
| 2,015,784 | Brown | Oct. 1, 1935 |
| 2,335,420 | Jones | Nov. 30, 1943 |
| 2,433,518 | Ljunggren | Dec. 30, 1947 |

FOREIGN PATENTS

| Number | Country | Date |
| --- | --- | --- |
| 215,470 | Switzerland | June 30, 1941 |